United States Patent [19]
Tashiro et al.

[11] 4,063,043
[45] Dec. 13, 1977

[54] INTRAOFFICE ALTERNATE CONNECTION ARRANGEMENT

[75] Inventors: Joji Tashiro, Kawasaki; Tadahiko Kawanabe, Nagareyama; Noboru Araki, Tokyo; Kazuo Ashihara, Kodaira; Toshio Ando, Machida; Sadayuki Hiragi; Kazuo Itoh, both of Yokohama; Yukio Ozawa, Hiratsuka; Eiichi Odera, Kunitachi; Kosuke Inoue, Kawasaki, all of Japan

[73] Assignees: Nippon Telegraph and Telephone Public Corporation; Oki Electric Industry Co., Ltd.; Nippon Electric Company, Limited; Hitachi, Ltd.; Fujitsu Limited, all of Japan

[21] Appl. No.: 584,502

[22] Filed: June 6, 1975

Related U.S. Application Data

[63] Continuation of Ser. No. 431,370, Jan. 7, 1974, abandoned, which is a continuation of Ser. No. 327,231, Jan. 26, 1973, abandoned, which is a continuation of Ser. No. 194,074, Oct. 29, 1971, abandoned, which is a continuation of Ser. No. 627,930, April 3, 1967, abandoned.

[30] Foreign Application Priority Data

Apr. 14, 1966  Japan .................................. 41-23180

[51] Int. Cl.² ............................................ H04Q 3/495

[52] U.S. Cl. .............................................. 179/18 EA
[58] Field of Search .................... 179/22, 18 EA, 18 E

[56] References Cited

U.S. PATENT DOCUMENTS

| 2,945,211 | 7/1960 | Gibson et al. ................. 179/18 E X |
| 3,041,409 | 6/1962 | Zarouni ................................... 179/22 |
| 3,185,773 | 5/1965 | Engeman et al. ...................... 179/22 |

*Primary Examiner*—Thomas W. Brown
*Attorney, Agent, or Firm*—Watson, Cole, Grindle & Watson

[57] ABSTRACT

An intraoffice trunk switching system wherein a connecting path between the called subscriber and the intraoffice trunk is established first; the connecting path between the calling subscriber and the intraoffice trunk to which the called subscriber is connected is then selected so that if no idle channel is available the first connecting path is released and simultaneously therewith the connecting operation between the calling subscriber and the intraoffice trunk is stopped and an idle intraoffice trunk is selected. The connecting path between the called subscriber and the selected intraoffice trunk is established and then the connecting path between the calling subscriber and the selected intraoffice trunk is set to improve the link block ratio of the intraoffice connection.

3 Claims, 4 Drawing Figures

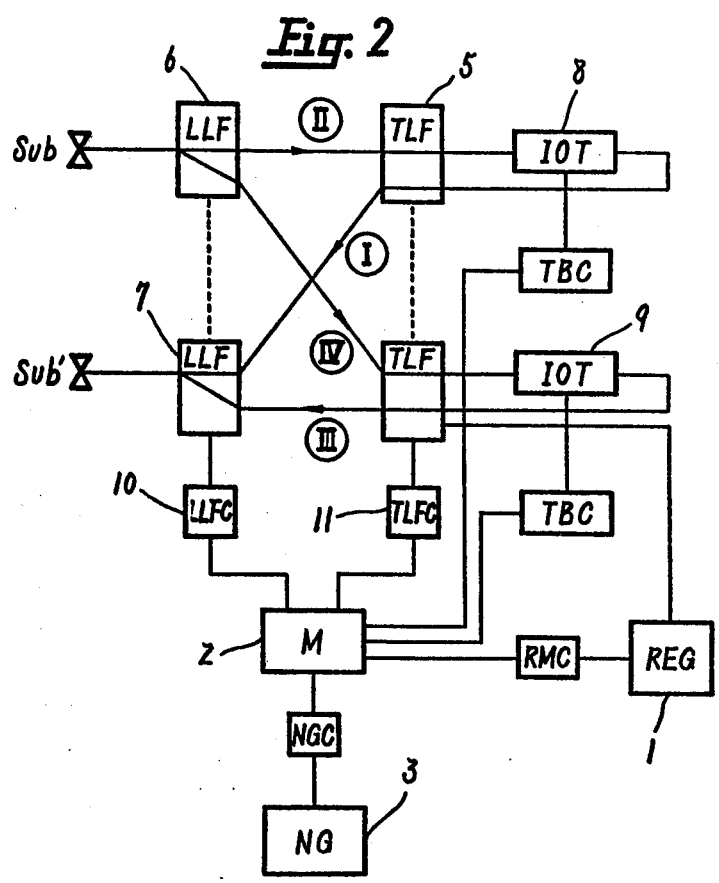

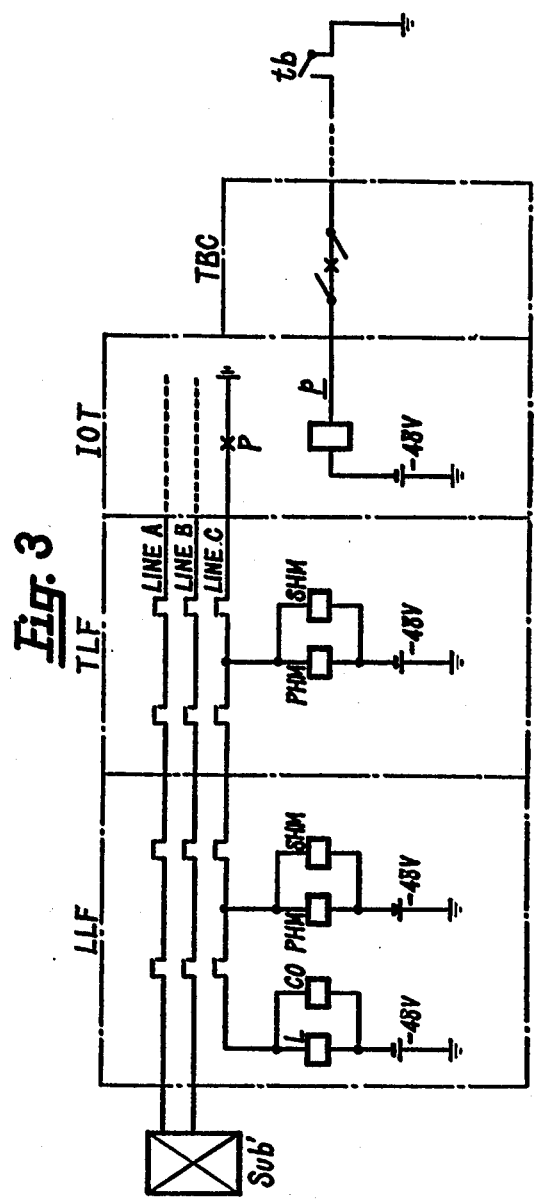

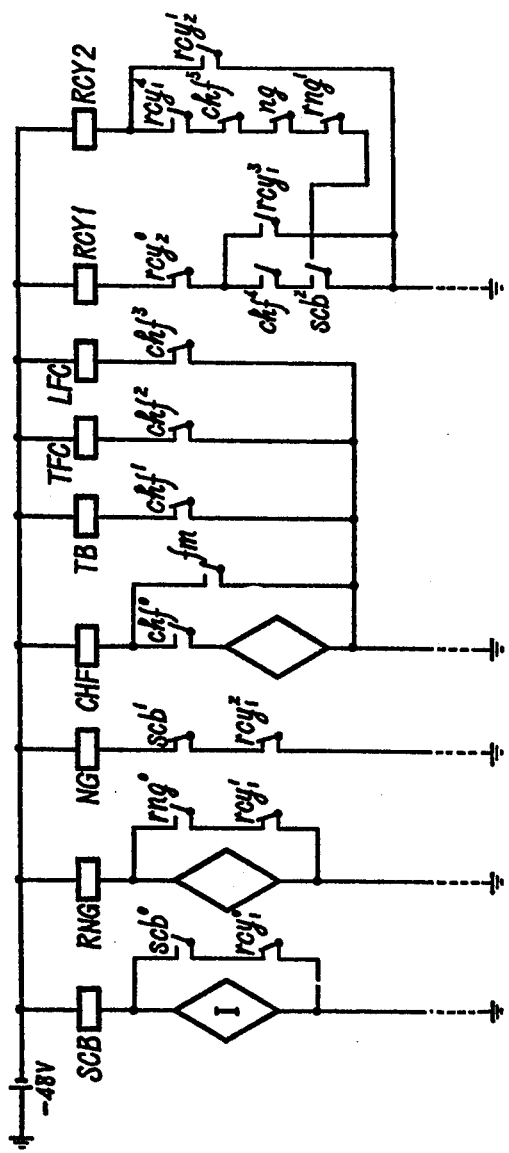

INTRAOFFICE ALTERNATE CONNECTION ARRANGEMENT

This is a continuation of application Ser. No. 431,370 filed Jan. 7, 1974; which is a continuation of Ser. No. 327,231, filed Jan. 26, 1973; which is a continuation of Ser. No. 194,074, filed Oct. 29, 1971; which is a continuation of Ser. No. 627,930, filed Apr. 3, 1967, all abandoned.

This invention relates to frame recycling apparatus for making an intraoffice connection in a common controlled switching system.

In such common controlled automatic switching systems formed of a multistage link frame as, for example, a crossbar switching network, the traffic capacity of the switching frame has been limited by the terminating connection which is not capable of performing a frame recycle operation to improve the link block ratio in the frame of a connecting selection path on the side of a calling subscriber in an intraoffice connection.

An object of the present invention is to increase the traffic capacity of a frame or decrease the number of intraoffice trunks by improving the link block ratio in an intraoffice connection.

In the accompanying drawings,

FIG. 2 illustrates an intraoffice connection by a trunking system according to the present invention;

FIG. 3 is a diagram showing an embodiment for the formation of a speech path of a called party in an intraoffice connection;

FIG. 4 is a diagram showing a control circuit in a marker for carrying out a recycle operation at the time of an intraoffice connection according to the present invention.

Figure 1:
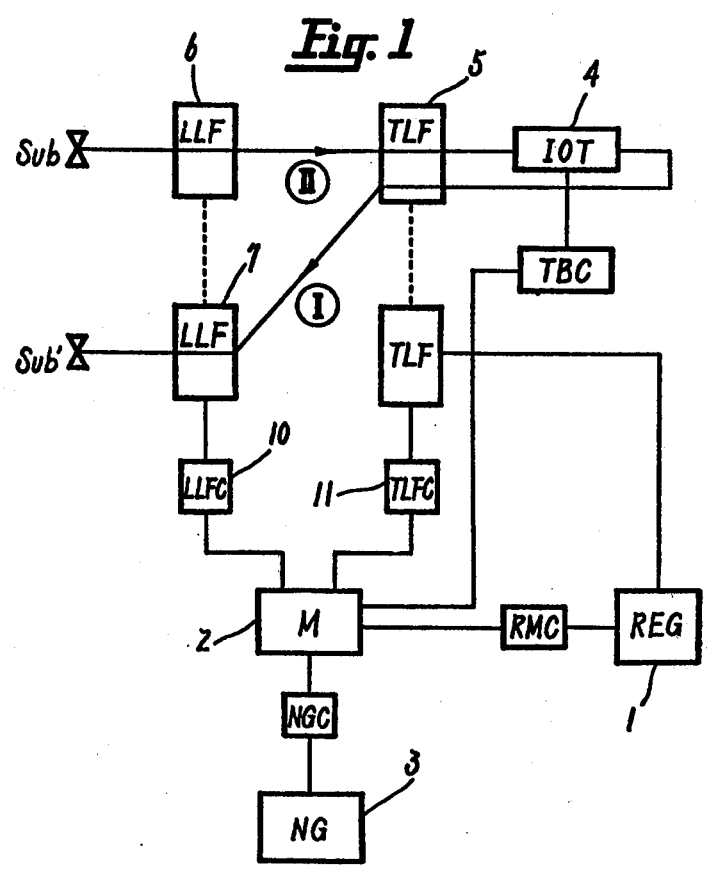
FIG. 1 illustrates an intraoffice connection formed of multistage connection frames in a conventional trunking system.

FIG. 1 is a trunking diagram illustrating an intraoffice connection in a conventional system. In such a system, when the dialing by a calling subscriber Sub is completed, a register 1 will start a marker 2 and the called party number and other information required for the connection as received in the register will be transferred to the marker. In marker 2, a connecting operation will be started by the information received from the register 1. That is to say, when the called subscriber number is identified to be for an intraoffice connection, the marker 2 will start a number group 3 and will send the called subscriber number to the number group 3 so that the information of the called subscriber's Sub' line location may be obtained from the number group. The number group herein mentioned is a means for converting the called subscriber number to information relating to its location on the frame. When the marker 2 operates intraoffice trunk 4 and selects an idle trunk, a trunk link frame 5 accommodating the trunk and a line link frame 7 accommodating the called subscriber will be connected into the marker 2 respectively through a trunk link frame connector 11 and a line link frame connector 10. The channel of the link between the called subscriber terminal and the selected idle intraoffice trunk 4 will be matched and determined so that a connection I may be made between them.

If there is no idle link channel, the marker will release the control circuit which selects the intraoffice trunk circuit in the marker. An idle intraoffice trunk of another frame will be selected, an attempt made to match its link channel thereto, and will perform a so-called frame recycle operation will be performed.

It is to avoid the ineffective operation of the marker 2 in the case that the called subscriber is busy that the connection on the side of the called subscriber is made prior to the connection on the side of the calling subscriber in the intraoffice connection.

When the connection between the trunk and the called subscriber is completed, the marker will switch its control circuit to the calling side connection and will perform the operation of the connection II in the same manner. If, in such case, the link channel can not be matched, as both ends of the intraoffice trunk and the calling subscriber terminal are determined, no recycle operation will be possible, the marker will release them without connecting them and the call will not be completed.

A connection control system diagram of the present invention is shown in FIG. 2.

When the dialing by a calling subscriber ends, a register 1 will start a marker 2 and the called subscriber number and other information required for the connection as received in the register will be transferred to the marker. In the marker 2, a connecting operation will be carried out by the information received from the register 1. When the called subscriber number is identified as an intraoffice connection, the marker 2 will start a number group 3 and will send the called subscriber number to the number group 3 so that the information of the called party line location may be obtained from the number group.

When the marker 2 operates to select an idle intraoffice trunk, e.g., an intraoffice trunk 8 in FIG. 2, a trunk link frame 5 accommodating the trunk and a line link frame 7 accommodating the called subscriber Sub' will be connected into the marker 2 respectively through a trunk link frame connector 11 and a line link frame connector 10 and a busy test of the called subscriber will be made. Thereafter a link between the trunk link frame and the line link frame will be selected so that a connection I may be made between them.

The frame recycle operation when there is no idle link channel may be made in the same manner as in the case of the conventional system.

Then the marker 2 will have its control circuit switched to the calling side connection and, in the same manner, the connecting operation shown in II in FIG. 2 will be made. If the link channel can not be matched here, the marker will release the already connected and held connecting selection path I between the intraoffice trunk 8 and called subscriber in FIG. 2.

Then the marker will operate to select an idle intraoffice trunk in a frame different from that of the cleared intraoffice trunk depending on the information of the recycle operation, that is, intraoffice trunk 9 in FIG. 2 will be utilized. The trunk link frame accommodating the intraoffice trunk and the line link frame 7 accommodating the called subscriber Sub' will be connected into the marker 2 through the trunk link frame connector 11 and the line link frame connector 10, respectively, to match the channel link between the called subscriber terminal and the selected idle intraoffice trunk and determining the channel link, so that a connection III may be established between them.

Then the marker 2 will switch its control circuit to the calling subscriber side and determine the channel link between the calling subscriber terminal and the intraoffice trunk connected with the called subscriber, so that a connection IV may be established between them; whereby the intraoffice connection is completed and the calling subscriber can call the called subscriber through the intraoffice trunk 9.

Furthermore, in case of the above mentioned connecting operation as to the selected path II in the case where no idle channel is available, the connecting selection path I which was previously connected between the called subscriber and the intraoffice trunk circuit S is released, it then being necessary to take measures for accelerating the release of the speech path holding relay in which the trunk 8 was operated by the starting of the marker 2. Alternatively, for example, the slow release circuit of the trunk may be constructed such that it has no effect on the speech path holding relay until the connection on the calling subscriber side is completed. Otherwise, as the connecting path in the called side selection operation is not released in the recycle operation on the calling subscriber side, the link block ratio is degraded. Furthermore, if the aforedescribed controlling operation of the marker 2 is started after confirmation of the release of the connecting selection path, the holding time of the marker will be increased.

As explained in the above with reference to FIG. 2, the marker 2 receives various necessary information from the register and operates the number group relays shown in FIG. 4 to start the number groups so as to send the called subscriber number to the number group 3, thereby receiving the information of the called party line location from the number group. The marker selects an idle intraoffice trunk and attempts to set up a connection between this intraoffice trunk and the called subscriber.

When a switching train on a called subscriber side has been set, a circuit I which is a called subscriber side connection completion checking circuit in FIG. 4 will be closed and a relay SCB will operate and will be self-held by a contact $scb^0$ of the relay SCB. The circuit I which is the operating circuit of the relay SCB will then be in an open state and the relay SCB will continue to operate due to the ground via the contact $scb^0$. In this state, the marker will start to select a calling subscriber side connection.

The marker connects to the frame LLF[7] accommodating the line of the calling subscriber through the frame connector LLFC[10], whereby the channel link between the calling subscriber side of the intraoffice trunk which has been connected with the called subscriber side and the calling subscriber may be tested. In case there is no idle channel link in this test of the channel link, a relay FM not illustrated will operate and a relay CHF will be operated by its contact $fm$. The relay CHF is held via ground passed through a circuit III which is a circuit to check the release of the relay over its own contact $chf^0$ and the release of the frame control. Circuit III comprises relay contacts for the frame control in the calling subscriber side connection. Relays TB, TFC and LFC will be released respectively by contacts $chf^1$, $chf^2$ and $chf^3$ of the relay CHF. The relay TB is a relay for ordering the start of a trunk block connector forming a selection circuit for the trunk IOT in FIG. 3. The relay TFC is a relay for ordering the start of a trunk link frame connector. The relay LFC is a relay for ordering the start of a line link frame connector. When the above mentioned three relays are released, the respective connectors not illustrated will be released. The release of the trunk link frame connector and the line link frame connector is confirmed by the circuit III. Further, when the frame connectors are released, the relay FM will be released and the relay CHF will be also released. Further, when the relay TB is released, a relay P of the trunk IOT will be released through the trunk block connector TBC in FIG. 3, whereby the switch magnets PHM and SHM of the switch frames LLF and TLF and the relays L and CO of the LLF will be released and the once set called subscriber side train will be cleared.

On the other hand, in FIG. 4, when the relay CHF operates, a relay RCY 1 will be operated by the ground of the contact $chf^4$ of the relay CHF and the contact $scb^2$ of the relay SCB and will be self-held by its contact $rcy_1{}^3$. By the operation of the relay RCY 1, a relay RNG already operated by the circuit II which is a received number group information checking circuit will be released. Further, the holding circuit of the relay SCB will be open with the opening of the contact $rcy_1{}^0$ and the relay SCB will be released. The relay RNG is a received number group output information checking relay and is to be used to order the clearing of the number group after the received number group output information is checked.

When the above mentioned relay CHF is released in the above mentioned state, the relay RCY 2 will be operated by the ground through the contact $rcy_1{}^4$ of the relay RCY 1, the contact $chf^5$ of the relay CHF, the contact ng of the relay NG and the contact $scb^2$ of the relay SCB and will be self-held by its contact $rcy_2{}^1$. Further, the holding ground of the relay RCY 1 will be cut with the opening of the contact $rcy_2{}^0$ of the relay RCY 2 and the relay RCY 1 will be released.

When the relay RCY 1 is released, by its contact $rcy_1{}^2$ and the contact $scb^1$ of the already released relay SCB, the relay NG will be operated. The relay NG is a number group which orders the relay to start the number group again so as to extract the called subscriber information. In the above described situation, the number group is used to extract again the information of the called subscriber line location when switching the connection of the intraoffice trunk. However, if a circuit for memorizing the information of the called subscriber line location extracted initially from the number group has been provided in the marker until the train on the calling subscriber side is set, it will be unnecessary to restart the number group when switching the connection of the intraoffice trunk.

Now, when the relay CHF is released, the relays TB, TFC and LFC will be operated again respectively by the contacts $chf^1$, $chf^2$ and $chf^3$. Thereafter, by any known means, the trunk IOT accommodated in another frame than the first used trunk link frame will be selected, that is to say, a frame recycle will be made possible.

The probability of a lost call by loss of the intraoffice connection in a multistage frame formation is as follows:

$$B = B_T + B_I + B_O$$

wherein $B_T$ is a link block ratio of the called subscriber to the intraoffice trunk, $B_O$ is a link block ratio of the calling subscriber to the intraoffice trunk and $B_I$ is a probability of the loss of the intraoffice trunk.

Further, in an office network consisting of a plurality of frames, use of by the recycle operation it is possible to make $B_T$ small enough.

For example, in a 4-stage link system, if the link block ratio is about 2/100 in the case where no recycle is made, it will be easy to make the link block ratio 1/1,000 by making one or two frame recycles. In the 4-stage connection, $B_O$ is about 2/100 in the conventional system but can be made approximately 1/1,000 by applying the present invention. If the value of the allowable call loss probability in the intraoffice connection is a constant, the probability $B_1$ may be determined by determining the values of $B_T$ and $B_O$. Therefore, in case B is fixed, it will be possible to increase the traffic capacity of the frame until $B_O$ becomes about 2/100. It is also possible to increase $B_I$ while fixing the traffic capacity of the frame. In other words, the number of intraoffice trunks can be decreased.

What is claimed is:

1. An intraoffice connection system in a common controlled automatic switching system, comprising:
    a plurality of subscriber equipment;
    a plurality of line link frames for accommodating said subscriber equipment at each line terminal of said line link frames;
    a plurality of intraoffice trunk equipment;
    a plurality of trunk link frames for accommodating said intraoffice trunk equipment, each of said line link frames being connected with each of said trunk link frames through linking means; and
    common control equipment including means for controlling connection between a called-subscriber and first idle intraoffice trunk equipment through a first connecting path including a first selected one of said line link frames and a first selected one of said trunk link frames, means for controlling release of said first connecting path together with said idle intraoffice trunk equipment when a second connecting path including a second selected other one of said line link frames and a second selected other one of said trunk link frames for establishing the connection between a calling subscriber and said intraoffice trunk equipment cannot be completed therethrough after connection with said first connecting path, means for controlling connection between said called subscriber and second idle intraoffice trunk equipment through a third trunk link frame other than said first selected trunk link frame in a third connecting path;
    means for controlling connection of said second intraoffice trunk equipment with the calling subscriber through a fourth selected one line link frame and a fourth trunk link frame in a fourth connecting path after the completion of connecting said third connecting path; and
    said third and fourth line link frames being independent of said first and second line link frames and said third and fourth trunk link frames being independent of said first and second trunk link frames.

2. An intraoffice connection system according to claim 1 wherein said common control equipment immediately releases said intraoffice trunk equipment when said second connecting path for connecting the calling subscriber with the intraoffice trunk equipment cannot be completed and said first connecting path is released by the release of said intraoffice trunk equipment.

3. An intraoffice connecting system according to claim 1 wherein said common control equipment includes a first relay circuit for confirming the release of both said intraoffice trunk equipment and said first connecting path and a second relay circuit for selecting intraoffice trunk equipment other than said first selected intraoffice trunk equipment when said first relay circuit operates.

* * * * *